US009589360B2

(12) United States Patent
Huang et al.

(10) Patent No.: US 9,589,360 B2
(45) Date of Patent: Mar. 7, 2017

(54) BIOLOGICAL UNIT SEGMENTATION WITH RANKING BASED ON SIMILARITY APPLYING A GEOMETRIC SHAPE AND SCALE MODEL

(71) Applicant: General Electric Company, Schenectady, NY (US)

(72) Inventors: Yuchi Huang, Beijing (CN); Alberto Santamaria-Pang, Niskayuna, NY (US); Jens Rittscher, Niskayuna, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 156 days.

(21) Appl. No.: 13/666,343

(22) Filed: Nov. 1, 2012

(65) Prior Publication Data

US 2014/0023260 A1    Jan. 23, 2014

Related U.S. Application Data

(60) Provisional application No. 61/741,769, filed on Jul. 23, 2012.

(51) Int. Cl.
*G06K 9/00* (2006.01)
*G06T 7/00* (2006.01)
*G06K 9/44* (2006.01)

(52) U.S. Cl.
CPC .......... *G06T 7/0081* (2013.01); *G06K 9/0014* (2013.01); *G06K 9/44* (2013.01);
(Continued)

(58) Field of Classification Search
CPC ......... G06T 7/0012; G06T 2207/30024; G06T 2207/10056; G06T 7/0085;
(Continued)

(56) References Cited

U.S. PATENT DOCUMENTS 5,799,101 A * 8/1998 Lee et al. ..................... 382/133
6,956,961 B2  10/2005 Cong et al.
(Continued)

OTHER PUBLICATIONS

Lezoray et al., Cooperation of Color Pixel Classification Schemes and Color Watershed: A Study for Microscopic Images, Jul. 2002, IEEE Transactions on Image Processing, vol. 11, No. 7, pp. 783-789.*
(Continued)

*Primary Examiner* — Vu Le
*Assistant Examiner* — Guillermo Rivera-Martinez
(74) *Attorney, Agent, or Firm* — Fletcher Yoder, P.C.

(57) ABSTRACT

Embodiments of the disclosure are directed to segmenting a digital image of biological tissue into biological units, such as cells. A first weak or data driven segmentation is generated using image data representing the digital image to segment the digital image into a first set of biological units. Applying a geometric model, each unit in the first set of biological units is ranked based on a similarity in shape and scale between the unit and one or more other units in the image. A subset of units from the first set of biological units is selected based on the rank of each biological unit relative to a predetermined threshold rank. A second weak or data driven segmentation may then be generated using image data including the subset of biological units to segment that portion of the digital image into a second set of biological units.

24 Claims, 12 Drawing Sheets

(52) U.S. Cl.
CPC .. *G06T 7/0091* (2013.01); *G06T 2207/10056* (2013.01); *G06T 2207/20016* (2013.01); *G06T 2207/20036* (2013.01); *G06T 2207/20152* (2013.01); *G06T 2207/30024* (2013.01)

(58) Field of Classification Search
CPC . G06T 2207/20152; G06T 2207/30004; G06T 7/408; G06T 7/0081; G06T 2207/20016; G06T 2207/20076; G06T 2207/20081; G06T 7/606; G06K 9/0014; G06K 9/00147; G06K 9/00127; G06K 9/6247; G06K 9/342
See application file for complete search history.

(56) References Cited

U.S. PATENT DOCUMENTS

| | | | |
|---|---|---|---|
| 7,151,847 | B2 | 12/2006 | Vaisberg et al. |
| 2006/0127881 | A1 | 6/2006 | Wong et al. |
| 2006/0204953 | A1* | 9/2006 | Ptitsyn .............................. 435/4 |
| 2007/0058836 | A1* | 3/2007 | Boregowda et al. .......... 382/103 |
| 2007/0100562 | A1* | 5/2007 | Bartels et al. ................... 702/20 |
| 2007/0202519 | A1 | 8/2007 | Rao et al. |
| 2009/0215642 | A1* | 8/2009 | Knudson et al. .................. 506/9 |
| 2009/0238457 | A1* | 9/2009 | Rittscher et al. ............. 382/171 |
| 2009/0297015 | A1* | 12/2009 | Jetzek ............................ 382/133 |
| 2010/0111396 | A1* | 5/2010 | Boucheron .................... 382/133 |
| 2011/0038523 | A1* | 2/2011 | Boardman ..................... 382/133 |
| 2011/0123090 | A1* | 5/2011 | Zerfass et al. ................. 382/134 |
| 2011/0249883 | A1 | 10/2011 | Can et al. |
| 2011/0286654 | A1* | 11/2011 | Krishnan ....................... 382/133 |

OTHER PUBLICATIONS

Lin et al., A Hybrid 3D Watershed Algorithm Incorporating Gradient Cues and Object Models for Automatic Segmentation of Nuclei in Confocal Image Stacks, Feb. 2003, Wiley-Liss, Inc., Cytometry Part A 56A:23-36.*
Cheng et al., Segmentation of Clustered Nuclei With Shape Markers and Marking Function, Mar. 2009, IEEE Transactions on Biomedical Engineering, vol. 56, No. 3, pp. 741-748.*
Genctav et al., Unsupervised segmentation and classification of cervical cell images, May 2012, Pattern Recognition, vol. 45, pp. 4151-4168.*
Plissiti et al., Combining Shape, Texture and Intensity Features for Cell Nuclei Extraction in PAP Smear Images, 2011,Pattern Recognition Letters, vol. 32, No. 6, pp. 838-853.*
Yang et al., Unsupervised Segmentation Based on Robust Estimation and Color Active Contour Models, Sep. 2005, IEEE Transactions on Information Technology in Biomedicine, vol. 9, No. 3, pp. 475-486.*
Adiga et al., High-throughput analysis of multispectral images of breast cancer tissue, IEEE Transactions on Image Processing, 15(8):2259-2268, Aug. 2006.
Chi-Man et al., "A Region-Based Image Segmentation by Watershed Partition and DCT Energy Compaction", 2011 Eighth International Conference on Computer Graphics, Imaging and Visualization (CGIV), pp. 131-135, Location: Singapore, Aug. 17-19, 2011.
Dalal et al., Histograms of oriented gradients for human detection, Proc. of the IEEE Computer Society Conf. on Computer Vision and Pattern Recognition, CVPR'2005.
Haris et al., "Watershed-Based Image Segmentation with Fast Region Merging" , Proceedings. 1998 International Conference on Image Processing, vol. 3, pp. 338-342,Location: Chicago, IL, USA, Oct. 4-7, 1998.
Haris et al., "Hybrid Image Segmentation Using Watersheds and Fast Region Merging", IEEE Transactions on Image Processing, vol. 7, Issue 12,pp. 1684-1699, Dec. 1998.
Hodge et al., A survey of outlier detection methodologies, Artificial Intelligence Review, 22:2004, 2004.
Lin et al., A hybrid 3d watershed algorithm incorporating gradient cues and object models for automatic segmentation of nuclei in confocal image stacks, Cytometry Part A, 56A(1):23-36, 2003.
Liu et al., Exploiting local structure for tracking plant cells in noisy images, Proceedings of the 16th IEEE international conference on Image processing, ICIP'09, pp. 1745-1748, 2009.
McCullough et al., 3d segmentation of whole cells and cell nuclei in tissue using dynamic programming, 4th IEEE International Symposium on Biomedical Imaging: From Nano to Macro, 2007, pp. 276-279, Apr. 2007.
Mori et al., Efficient shape matching using shape contexts, IEEE Transactions on Pattern Analysis and Machine Intelligence, 27(11):1832-1837, Nov. 2005.
Moussavi et al., 3d segmentation of cell boundaries from whole cell cryogenic electron tomography volumes, Journal of Structural Biology, 170(1):134-145, Apr. 2010.
Nasr-Isfahani et al., A new approach for touching cells segmentation, vol. 1, pp. 816-820, May 2008.
Padfield et al., Spatio-temporal cell segmentation and tracking for automated screening, 5th IEEE International Symposium on Biomedical Imaging: From Nano to Macro, 2008, pp. 376-379, May 2008.
Pan et al., Heterogeneous conditional random field: Realizing joint detection and segmentation of cell regions in microscopic images, CVPR, pp. 2940-2947, 2010.
Park et al., "Automatic Cell Segmentation in Microscopic Color Images Using Ellipse Fitting and Watershed", 2010 IEEE/ICME International Conference on Complex Medical Engineering, pp. 69-74, Location: Gold Coast, QLD., Jul. 13-15, 2010.
Shah, Automatic cell segmentation using a shape-classification model in immunohistochemically stained cytological images, IEICE—Trans. Inf. Syst., E91-D:1955-1962, Jul. 2008.
Vincent et al., Watersheds in digital spaces: An efficient algorithm based on immersion simulations, IEEE Trans. Pattern Anal. Mach. Intell., 13:583-598, Jun. 1991.
Wu et al., A bottom-up and top-down model for cell segmentation using multispectral data, Proceedings of the 2010 IEEE international conference on Biomedical imaging: from nano to Macro, pp. 592-595, 2010.
Yang Mingqiang et al., A survey of shape feature extraction techniques. Pattern Recognition, 43:90, 2008.
Yin et al., Cell segmentation in microscopy imagery using a bag of local Bayesian classifiers, The IEEE International Symposium on Biomedical Imaging (ISBI) 2010, Apr. 2010.

* cited by examiner

BIOLOGICAL UNIT SEGMENTATION WITH RANKING BASED ON SIMILARITY APPLYING A GEOMETRIC SHAPE AND SCALE MODEL

RELATED APPLICATIONS

This application claims priority to U.S. Provisional Patent Application Ser. No. 61/741,769, entitled "BIOLOGICAL UNIT SEGMENTATION WITH RANKING BASED ON SIMILARITY APPLYING A GEOMETRIC SHAPE AND SCALE MODEL," filed on Jul. 23, 2012, which is hereby incorporated by reference in its entirety.

FIELD

Embodiments relate generally to analysis of digital images, and more particularly, to analysis of digital images of biological tissue samples.

BACKGROUND

The term segmentation, as used herein, refers to the identification of boundaries of biological units, such as cells, within a digital image. The digital image may be obtained using a microscope. Weak or data driven segmentations may be used to define cell boundaries. For example, a watershed transform is one image processing technique that has been used for segmenting images of cells. With the watershed transform, a digital image may be modeled as a three-dimensional topological surface, where values of pixels (e.g., brightness or grey level) in the image represent geographical heights. Imaginary rain falling on the surface of the three-dimensional image collects in areas called catchment basins (i.e., valleys, troughs or low points of the surface), and ridge lines become visible above the waterline at a given flooding level. The ridge lines may represent the boundaries of cells in the image at the flooding level, thus providing reference points for segmenting the image.

Due to variations in the shape and composition of each cell, however, weak or data driven segmentations may not produce an accurate segmentation without significant adaptation and optimization to specific tissue type applications. For example, a weak segmentation algorithm may cause the image to be over-segmented (e.g., what appears as a single cell may actually be only a portion of a cell) or under-segmented (e.g., what appears as a single cell may actually be several different cells in combination). Furthermore, the image may not be properly segmented with a weak segmentation algorithm, in part, because a suitable segmentation parameter for one region of the image may not work well in other regions of the same image.

SUMMARY

In one embodiment, a method of segmenting a digital image includes generating a first weak or data driven segmentation of image data representing the digital image to segment the image into a first set of biological units. Each biological unit may be ranked according to similarities in shape and scale between the biological unit and one or more other biological units in the first set. A subset of biological units from the first set may be selected based on the rank of each biological unit relative to a predetermined threshold rank. For example, the subset may include under-segmented biological units in the digital image. The region(s) of the digital image containing the subset of biological units may then be re-segmented (e.g., using a second weak or data driven segmentation, which may be different than the first weak or data driven segmentation), re-ranked and further sub-grouped as described above, using different segmentations for each iteration until there is little or no further improvement in the quality of the segmentation. In some embodiments, the weak or data driven segmentation may include a watershed segmentation.

In one embodiment, a computer-implemented method of segmenting a digital image of biological tissue includes acts of generating, by a processor, a first weak or data driven segmentation of image data representing the digital image of the biological tissue to segment the digital image into a first set of biological units. The method further includes assigning, by the processor, a rank to each biological unit in the first set of biological units based on a similarity in shape and scale between the biological unit and one or more other biological units in the first set of biological units, wherein a geometric model is used to define the similarity. The method further includes selecting, by the processor, a subset of biological units from the first set of biological units based on the rank of each biological unit relative to a predetermined threshold rank. The method further includes generating, by the processor, a second weak or data driven segmentation of image data representing a portion of the digital image including the subset of biological units to segment the portion of the digital image into a second set of biological units. In some embodiments, the weak or data driven segmentation may include a watershed segmentation.

In some embodiments, the method may further include repeating the acts of assigning the rank, selecting the subset and generating the second weak or data driven segmentation until an average change in the rank of substantially all of the biological units in the digital image is no greater than a predetermined threshold level subsequent to the act of generating the second weak or data driven segmentation, wherein the second weak or data driven segmentation is different each time the second weak or data driven segmentation is generated.

In some embodiments, the method may further include an act of computing, by the processor, the rank of each biological unit as a function of a weighted sum of the similarity in shape and scale between the biological unit and the one or more other biological units. In some embodiments, the method may further include an act of computing, by the processor, the shape of each biological unit by applying a shape descriptor corresponding to a model of a two-dimensional ring having a variable diameter to the respective biological unit. The shape and scale of each biological unit may be represented as a histogram of points corresponding to a boundary of the biological unit, each point being located on a polar coordinate plane. In some embodiments, the method may further include an act of computing, by the processor, the similarity in shape between the biological unit and one of the other biological units in the first set of biological units as an exponential function of a distance between the respective histograms of the biological unit and the other biological unit. In some embodiments, the method may further include an act of rotating each biological unit within the polar coordinate plane such that an axis of least inertia of the biological unit coincides with a zero degree radial of the polar coordinate plane prior to computing the similarity in shape between the biological unit and the other biological unit, the axis of least inertia including a line from which the integral of the square of distances to each point on the boundary of the biological unit is a minimum. In some embodiments, the method may further include an act of computing, by the processor, the similarity in scale between the biological unit and one of the other biological units in the first set of biological units as an exponential function of a difference between an area of the biological unit in the polar coordinate plane and an area of the other biological unit in the polar coordinate plane.

In some embodiments, each biological unit selected for the subset of biological units may have a rank above the predetermined threshold rank. In some embodiments, higher rankings may correspond to lesser similarities in shape and scale between the biological unit and the one or more other biological units.

In some embodiments, the first set of biological units may include a cell.

In some embodiments, the method may include generating the first weak or data driven segmentation by applying, by the processor, a first watershed transform at a first predetermined flooding level to the image data representing the digital image of the biological tissue to segment the digital image into the first set of biological units, and generating the second weak or data driven segmentation by applying, by the processor, a second watershed transform at a second predetermined flooding level to the image data representing the portion of the digital image including the subset of biological units to segment the portion of the digital image into the second set of biological units. In some embodiments, the second predetermined flooding level may be different each time the second watershed transform is applied.

In some embodiments, the method may include generating, by the processor, a color map representing the first set of biological units in which each biological unit is assigned one of a plurality of different colors corresponding to the respective rank of the biological unit.

In one embodiment, a non-transitory computer-readable medium has stored thereon computer-executable instructions that when executed by a computer cause the computer to generate a first weak or data driven segmentation of image data representing a digital image of biological tissue to segment the digital image into a first set of biological units, assign a rank to each biological unit in the first set of biological units based on a similarity in shape and scale between the biological unit and one or more other biological units in the first set of biological units, select a subset of biological units from the first set of biological units based on the rank of each biological unit relative to a predetermined threshold rank, and apply a second weak or data driven segmentation of image data representing a portion of the digital image including the subset of biological units to segment the portion of the digital image into a second set of biological units.

In one embodiment, a system for segmenting a digital image of biological tissue includes a processor, an input coupled to the processor and configured to receive image data representing the digital image of biological tissue, and a memory coupled to the processor. The memory includes computer-executable instructions that when executed by the processor cause the processor to generate a first weak or data driven segmentation of the image data to segment the digital image into a first set of biological units, assign a rank to each biological unit in the first set of biological units based on a similarity in shape and scale between the biological unit and one or more other biological units in the first set of biological units, where a geometric model is used to define the similarity, select a subset of biological units from the first set of biological units based on the rank of each biological unit relative to a predetermined threshold rank, and apply a second weak or data driven segmentation of the image data representing a portion of the digital image including the subset of biological units to segment the portion of the digital image into a second set of biological units.

In some embodiments, the memory may further include computer-executable instructions that when executed by the processor cause the processor to repeat assigning the rank, selecting the subset and generating the second weak or data driven segmentation until an average change in the rank of substantially all of the biological units in the digital image is no greater than a predetermined threshold level subsequent to generating the second weak or data driven segmentation, wherein the second weak or data driven segmentation is different each time the second weak or data driven segmentation is applied. In some embodiments, the memory may further include computer-executable instructions that when executed by the processor cause the processor to compute the shape of each biological unit by applying a shape descriptor corresponding to a geometric model of a two-dimensional ring having a variable diameter to the respective biological unit.

In some embodiments, the memory may further include computer-executable instructions that when executed by the processor cause the processor to compute the similarity in shape between the biological unit and one of the other biological units in the first set of biological units as an exponential function of a distance between the respective histograms of the biological unit and the other biological unit. In some embodiments, the memory may further include computer-executable instructions that when executed by the processor cause the processor to compute the similarity in scale between the biological unit and one of the other biological units in the first set of biological units as an exponential function of a difference between an area of the biological unit in the polar coordinate plane and an area of the other biological unit in the polar coordinate plane.

In some embodiments, the memory may further include computer-executable instructions that when executed by the processor cause the processor to apply a first watershed transform at a first predetermined flooding level to the image data representing the digital image of the biological tissue to segment the digital image into the first set of biological units, and apply a second watershed transform at a second predetermined flooding level to the image data representing the portion of the digital image including the subset of biological units to segment the portion of the digital image into the second set of biological units. In some embodiments, the second predetermined flooding level may be different each time the second watershed transform is applied.

In some embodiments, the memory may further include computer-executable instructions that when executed by the processor cause the processor to generate a color map representing the first set of biological units in which each biological unit is assigned one of a plurality of different colors corresponding to the respective rank of the biological unit.

BRIEF DESCRIPTION OF THE DRAWINGS

Features and aspects of embodiments are described below with reference to the accompanying drawings, in which elements are not necessarily depicted to scale.

DETAILED DESCRIPTION

Figure 1A:
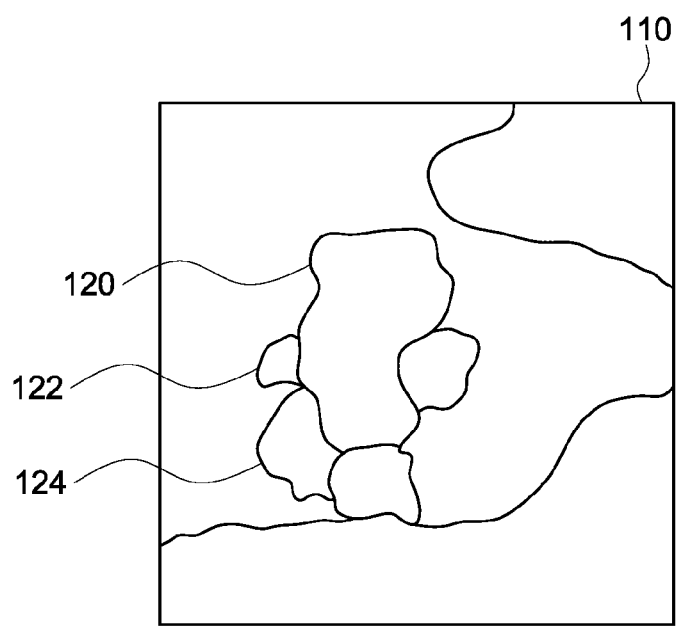
FIG. 1A depicts one example of a digital image of cells segmented using a conventional segmentation technique.

Embodiments are directed to systems and methods of segmenting biological units in a digital image of biological tissue. The digital image may be obtained, for example, using a microscope and a camera. The term biological unit, as used herein, refers to discrete biological structures and portions, components or combinations of biological structures in the digital image. The target biological units in the digital image may include, but are not necessarily limited to, cells.

In some embodiments, a method of segmenting a digital image of biological tissue includes generating a first weak or data driven segmentation of the image, such as by applying a first watershed transform to the image, to identify the boundaries or shapes of biological units corresponding to, e.g., a first flooding level of the watershed. Well-segmented areas of the digital image may include normal biological units that are likely to have shapes and scales similar to an average shape and scale of other biological units in the image. By contrast, under-segmented areas of the digital image may include abnormal biological units that may be treated as outliers deviating markedly from the normal biological units. Using a predetermined geometric shape descriptor, the shape and scale of each biological unit in the digital image may be compared to other biological units and ranked according to the degree of similarity with the other units. The ranking is considered to be unsupervised because it requires no special knowledge of the shape and/or scale of normal or abnormal biological units in the biological tissue sample. A threshold rank may be used to distinguish between normal and abnormal biological units in the digital image. Once the abnormal biological units are identified, a second weak or data driven segmentation, such as a second watershed transform, may be further generated for portions of the digital image containing the abnormal biological units using, e.g., one or more different flooding levels of the watershed to improve the overall segmentation.

In one embodiment, a method of segmenting a digital image of biological tissue includes identifying the boundaries or shapes of cells in the digital image based on a predetermined shape descriptor, such as a two-dimensional ring, that requires no special knowledge of normal or abnormal cell shapes and/or scales in the biological tissue sample. Once the cell boundaries are identified, the cells may be ranked based on similarities in shape and/or scale among the cells.

Based on the rank of each cell, the digital image may be subdivided to produce a new partition of the image, or subgrouping of cells, including under-segmented or abnormal cells. For example, if abnormal cells are ranked higher than normal cells, then cells ranked above a predetermined threshold rank may be considered abnormal cells and thus included in the partition. Either or both the normal and abnormal cells may be subdivided into more than one partition. The partition containing the abnormal cells may then be iteratively segmented (e.g., using a watershed transform at one or more different flooding levels), ranked and further sub-partitioned as described above until there is little or no further improvement in the quality of the segmentation. To produce a segmentation of the digital image or any partition thereof, a watershed algorithm may be used; however, it will be appreciated that different segmentation techniques may be used instead, such as super-pixel generation, mean shift segmentations, graph based segmentations and/or normalized cuts.

As discussed above, in one embodiment, the boundaries or shapes of cells may be identified based on a predetermined shape descriptor. In general, structural markers corresponding to the membrane and cytoplasm of a cell reach a maximum protein expression in the center of the membrane and cytoplasm respectively, while reaching a minimum protein expression in the stroma and nuclei regions. The structural markers are therefore suitable for identifying the boundaries of the membrane and cytoplasm using, for example, a shape descriptor corresponding to a geometrical model of a two-dimensional ring having varying diameter. In the model, a scale factor may correspond to the radius of the ring, where the scale factor at the center of the ring approaches one and the scale factor at the border of the ring approaches zero.

Figure 1B:
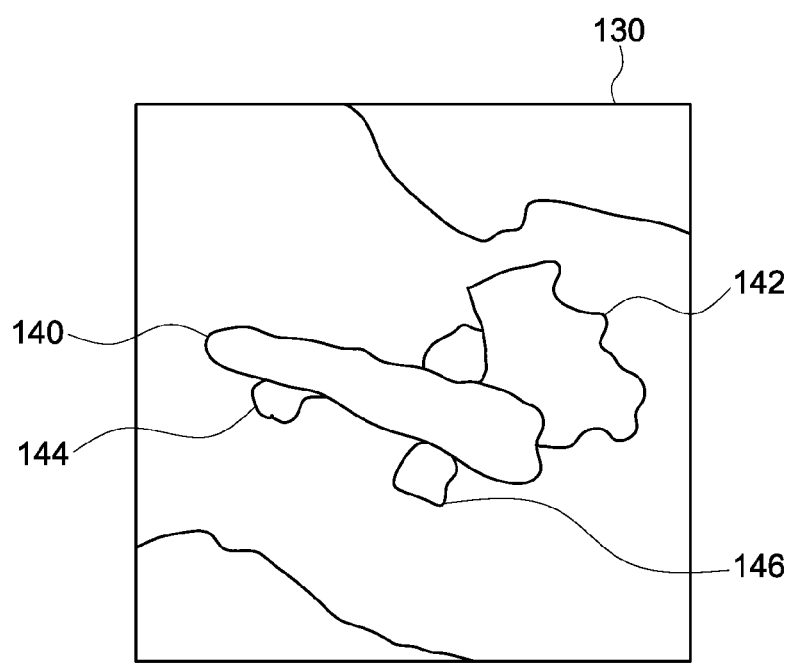
FIG. 1B depicts another example of a digital image of cells segmented using a conventional segmentation technique.

FIGS. 1A and 1B depict two different digital images 110 and 130 that have each been segmented using a conventional watershed transform at a first flooding level. For clarity, only a portion of the cells are depicted. Although the first flooding level may segment the majority of cells in the image, there may still be some regions of the image that are under-segmented. Under-segmented regions may include large cells (e.g., cell 120) and/or irregularly shaped cells (e.g., cells 140 and 142) in contrast to the shapes and scales of well-segmented cells in the image (e.g., shapes 122, 124, 144, 146).

Outlier detection methodologies may be used to identify anomalous observations in the digital image, including under-segmented regions. Under-segmented areas or cells in an image may be treated as outliers that deviate markedly from correctly segmented cells in the image. According to one embodiment, an exemplary outlier detection methodology is described below with respect to FIGS. 2A and 2B.

Figure 2A:
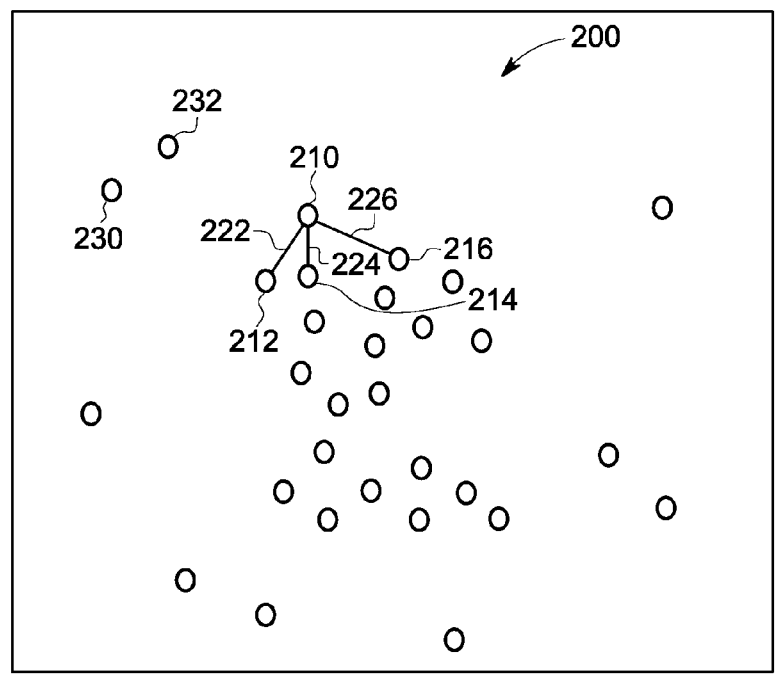
FIGS. 2A and 2B depict one example of data points representing cells in a digital image as detected using a shape descriptor, in accordance with one embodiment.
Figure 2B:
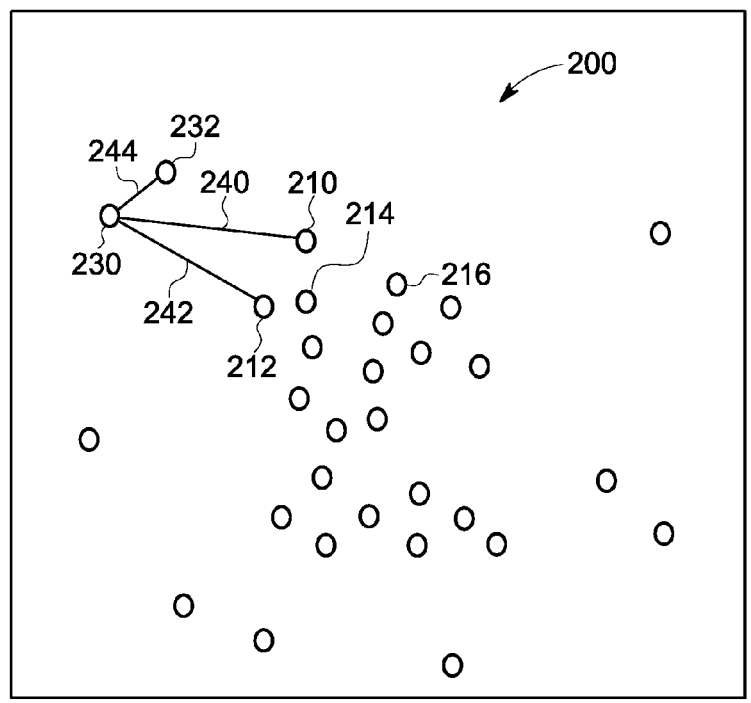

FIGS. 2A and 2B depict one example of a digital image 200 containing a plurality of data points 210, 212, 214, 216, 230 and 232. The data points 210, 212, 214, 216, 230, 232 represent boundaries or other portions of one or more cells in the image 200. Data points representing well-segmented, normal cells, such as data point 210, are relatively near to the k-nearest neighboring points, e.g., data points 212, 214 and 216. Data points representing under-segmented, abnormal cells, such as data points 230 and 232, are relatively far from the k-nearest neighboring points and thus appear as outliers. Thus, one measure of cell-to-cell similarity is the distance between the data points.

As shown in FIG. 2A, the distance between data points 210 and 212 is represented by line 222, the distance between data points 210 and 214 is represented by line 224, and the distance between data points 210 and 216 is represented by line 226. In this example, lines 222, 224 and 226 are substantially similar in length; in other words, cell-to-cell distances are similar for a normal cell, such as represented by data point 210. As shown in FIG. 2B, the distance between data points 230 and 210 is represented by line 240, the distance between data points 230 and 212 is represented by line 242, and the distance between data points 230 and 232 is represented by line 244. By comparison, lines 240 and 242 are substantially longer than lines 244, 222, 224 and 226 (as seen in FIG. 2A); in other words, cell-to-cell distances are dissimilar for an abnormal cell, such as represented by data point 230.

According to one embodiment, the sum of the similarities between one data point i and the k-nearest neighbors may be defined as:

$$S_i = \sum_{j \in N_i(k)} A(i, j), \tag{3}$$

where $N_i(k)$ is the set of ith k-nearest neighbors and $A(i, j)$ denotes the similarity between data point i and j (described below in further detail). The ranking of $S_i$ indicates the degree of abnormality of the ith cell; in other words, the top candidates in the ranking have a higher probability of being under-segmented.

Figure 3A:
FIG. 3A depicts one example of a digital image of a cell as detected using a shape descriptor, in accordance with one embodiment.
Figure 3B:
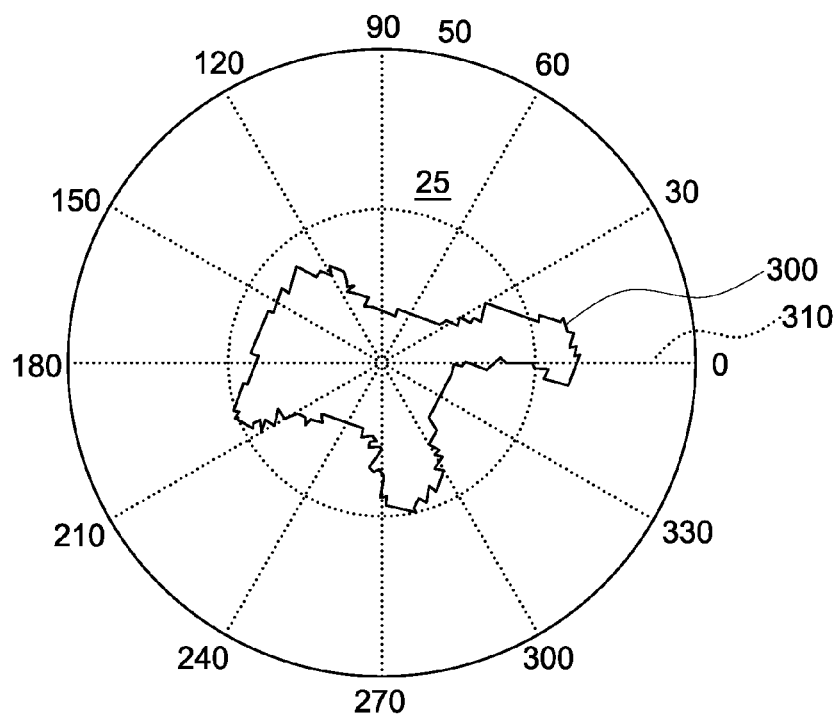
FIG. 3B depicts the cell of FIG. 3A oriented with respect to a polar coordinate plane, in accordance with one embodiment.
Figure 3C:
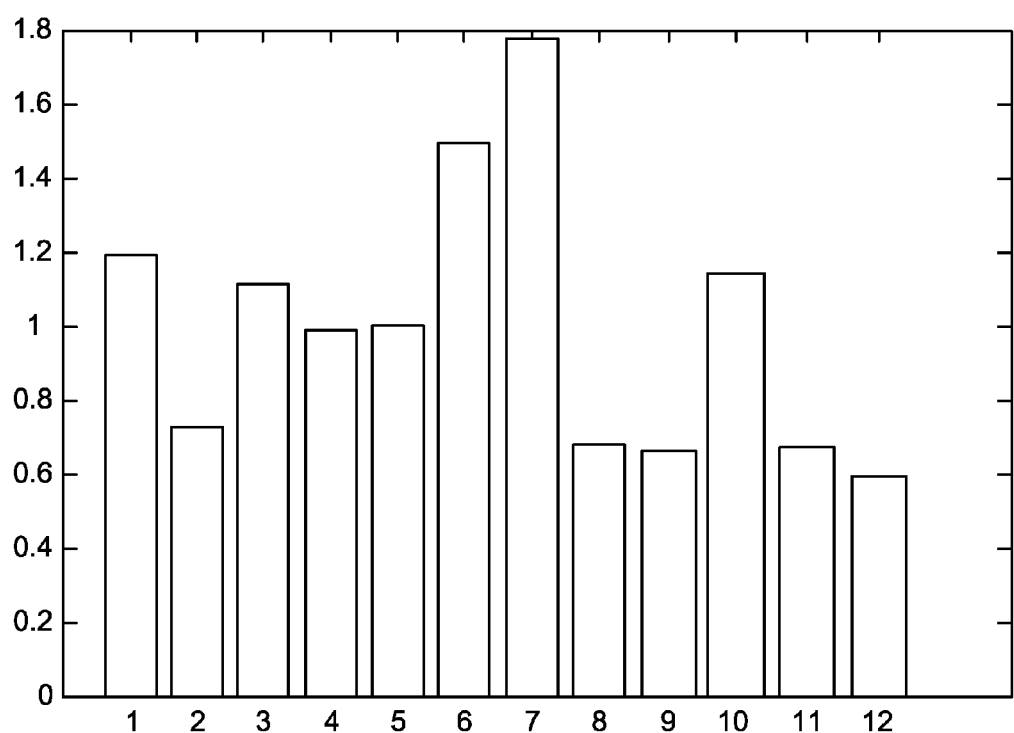
FIG. 3C depicts a histogram of boundary points of the cell depicted in FIG. 3B, in accordance with one embodiment.

According to one embodiment, the similarity in shape and scale between two cells in a digital image may be determined using a polar coordinate-based shape descriptor (e.g., a two-dimensional ring, such as described above, located in a polar coordinate plane). FIG. 3A depicts one example of a digital image of a cell 300. Initially, as depicted in FIG. 3B, the cell 300 may be rotated so that the zero degree radial 310 of the polar coordinate plane coincides with an orientation of the cell. The orientation of the cell, which is the axis of least inertia (ALI), may be defined as the line for which the integral of the square of the distances from the pole of the polar coordinate plane to each point on the boundary of the cell 300 is a minimum. After the cell 300 is oriented, the boundary points of the cell may be sampled using a morphological operation. For example, as illustrated in FIG. 3B, the polar coordinate plane may be divided into 12 30-degree bins. Each boundary point of the cell 300 may be represented in the polar coordinate system by a two-tuple (θ, ρ), where θ denotes the angular coordinate of the boundary point and ρ is the distance between the pole and the boundary point. A histogram of all boundary points, such as depicted in FIG. 3C, may be generated by projecting each point into a corresponding bin according to the following formula:

$$His(i) = \frac{1}{\sum_{\forall j} B(j)} \sum_{\forall \theta \in B(i)} \log\left(1 + \frac{1}{\rho}\right), \tag{4}$$

where B(i) denotes the degree interval of the ith bin and $$\frac{1}{\sum_{\forall j} B(j)}$$

is a normalization term. In FIG. 3C, the horizontal axis represents each of the 12 bins in the polar coordinate plane, and the vertical axis represents His(i) for each corresponding bin i. Because the shape descriptor is translation, rotation and scale variant, the logarithm function makes the shape descriptor more sensitive to the boundary points near to the pole than those of points far away. The $x^2$ distance function may be used to measure the shape-to-shape distance between two histograms p and q:

$$Dis_{shape}(p, q) = \frac{1}{2} \sum_{\forall k} \frac{(His_p(k) - His_q(k))^2}{His_p(k) + His_q(k)} \tag{5}$$

An exponential function may be used to compute the shape similarities of two cells p and q:

$$A_{shape}(p, q) = \exp\left(-\frac{Dis_{shape}(p, q)}{\overline{Dis}_{shape}}\right) \tag{6}$$

where $\overline{Dis}_{shape}$ is the mean value of cell-to-cell distances.

Since the under-segmented area is generally larger than well-segmented cells, the scale information may also be considered in the ranking. The scale, or size, similarity of two cells p and q can be defined as:

$$A_{scale}(p, q) = \exp\left(-\frac{Dif_{scale}(p, q)}{\overline{Diff}_{scale}}\right) \tag{7}$$

where $Dif_{scale}(p, q)$ is the scale difference between two cells p and q and $\overline{Diff}_{scale}$ is the mean value of all cell-to-cell scale differences.

Given the above shape and scale similarity values, cell-to-cell similarity may be defined as the weighted sum of the shape similarity and the scale similarity:

$$A(p,q) = \alpha A_{shape}(p,q) + (1-\alpha) A_{scale}(p,q) \tag{8}$$

where 0<α<1. In one example, α may be approximately 0.6, although it will be appreciated that other values of α may be used.

Figure 4A:
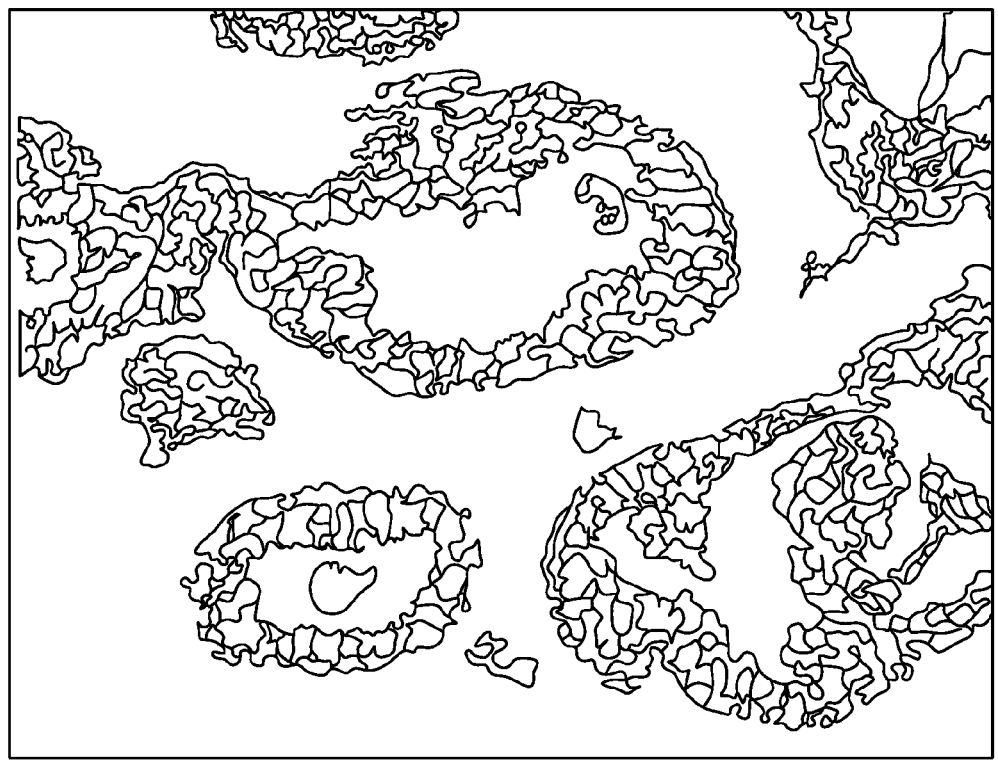
FIGS. 4A-4F depict several examples of segmented digital images, in accordance with one embodiment.
Figure 4B:
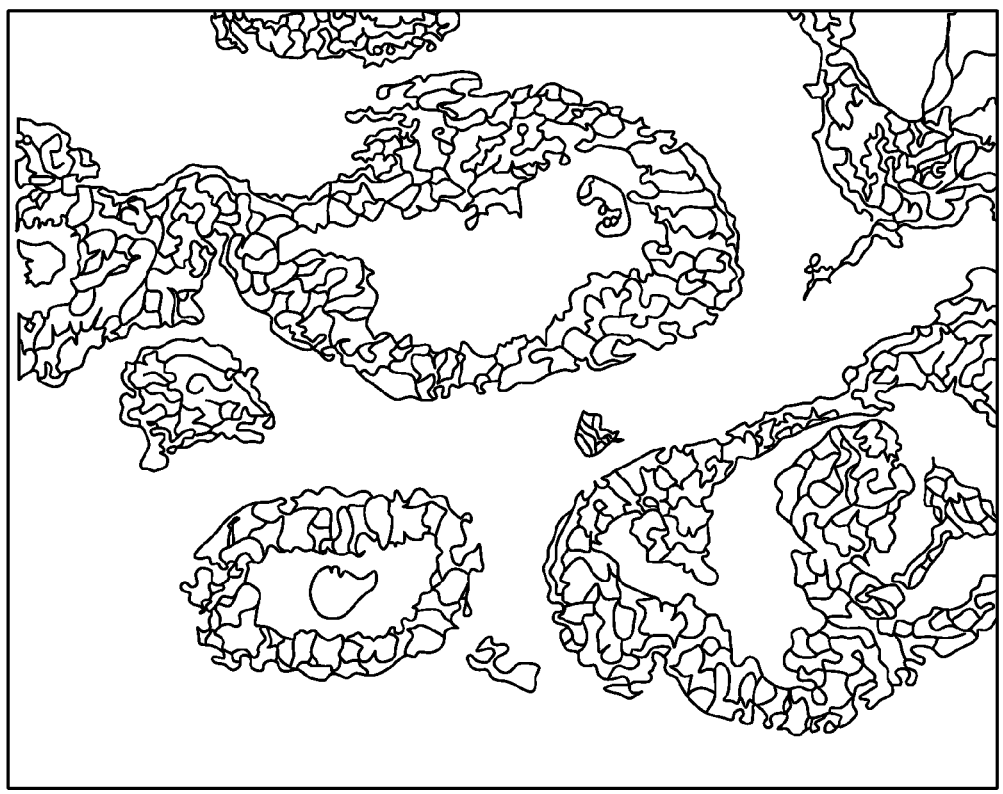
Figure 4C:
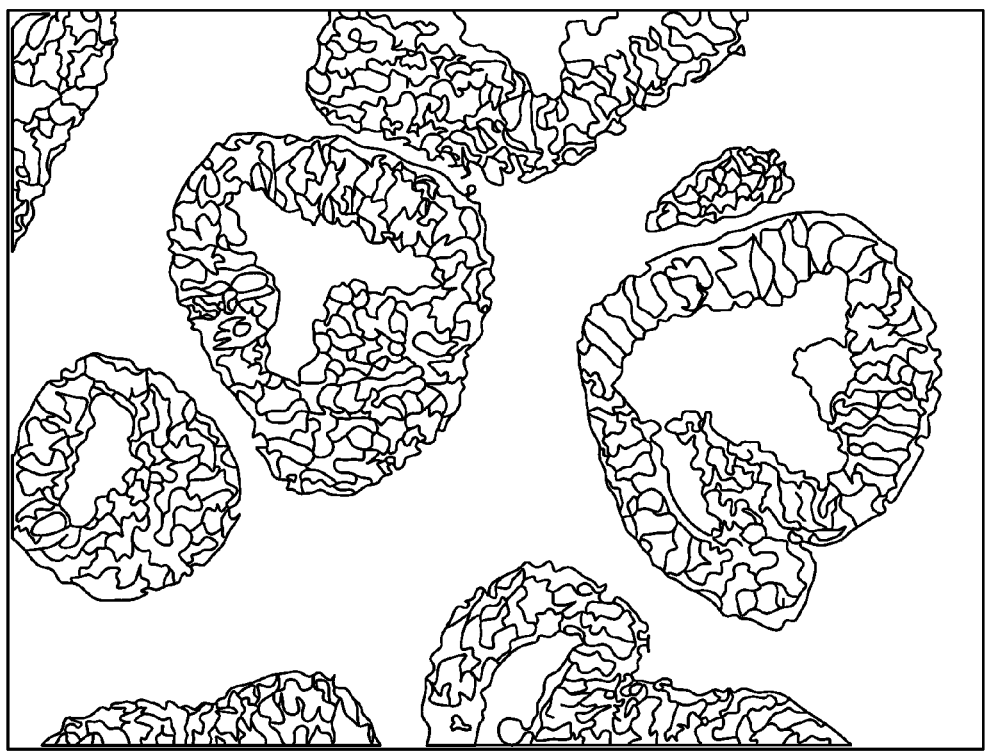
Figure 4D:
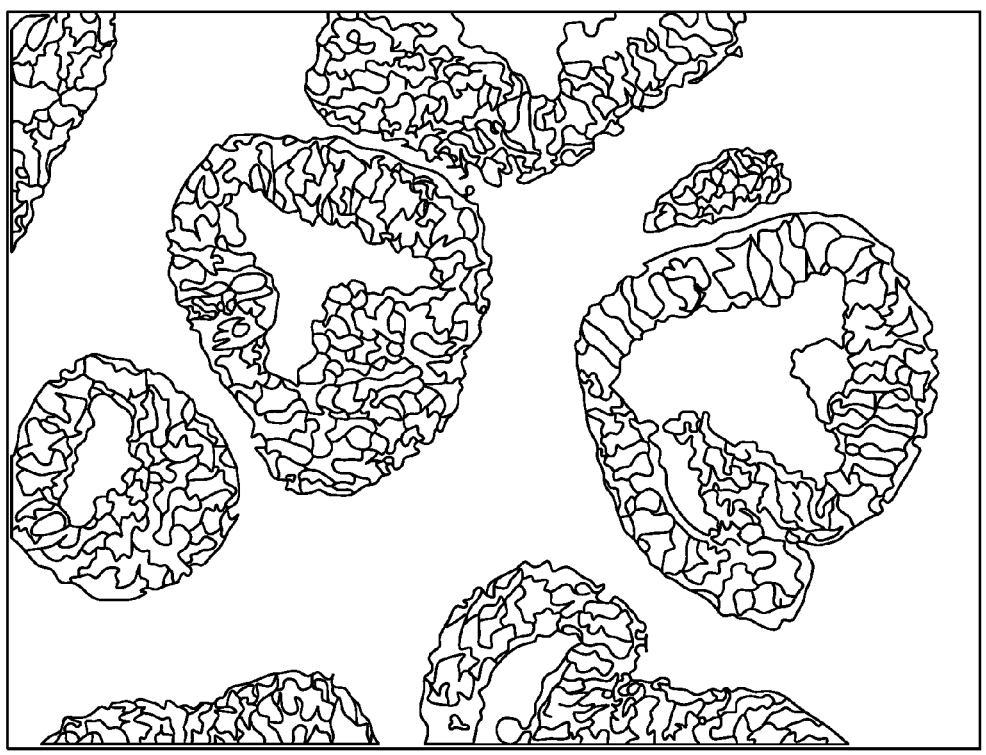
Figure 4E:
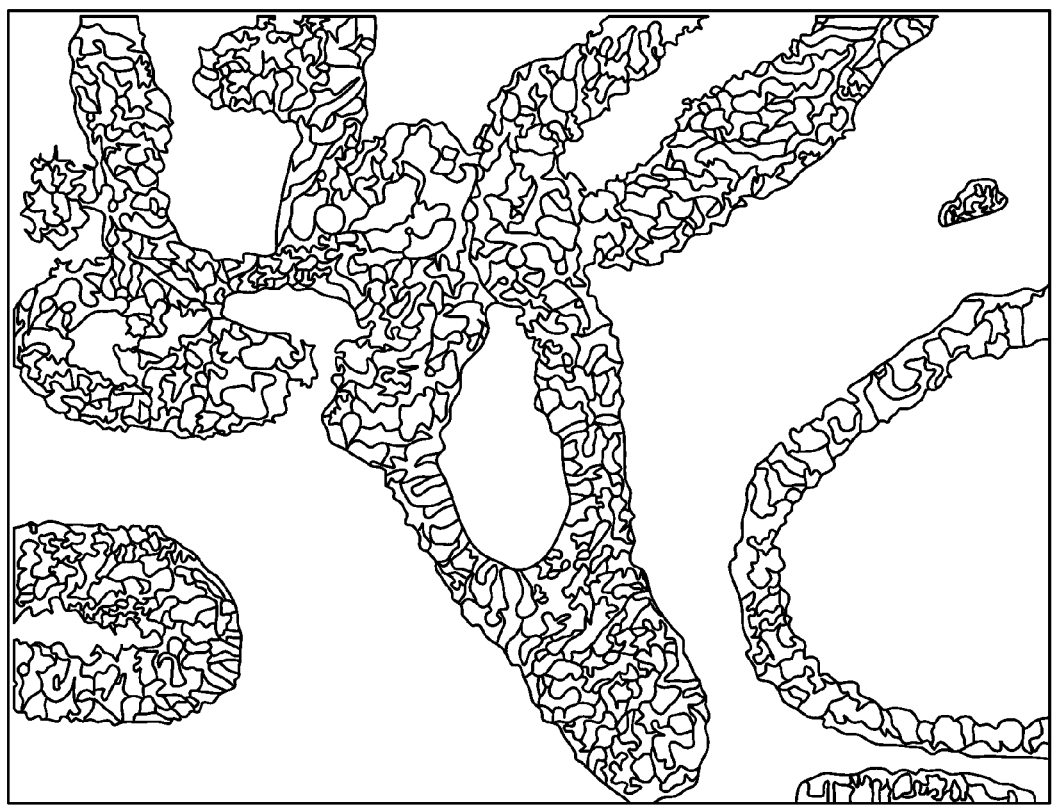
Figure 4F:
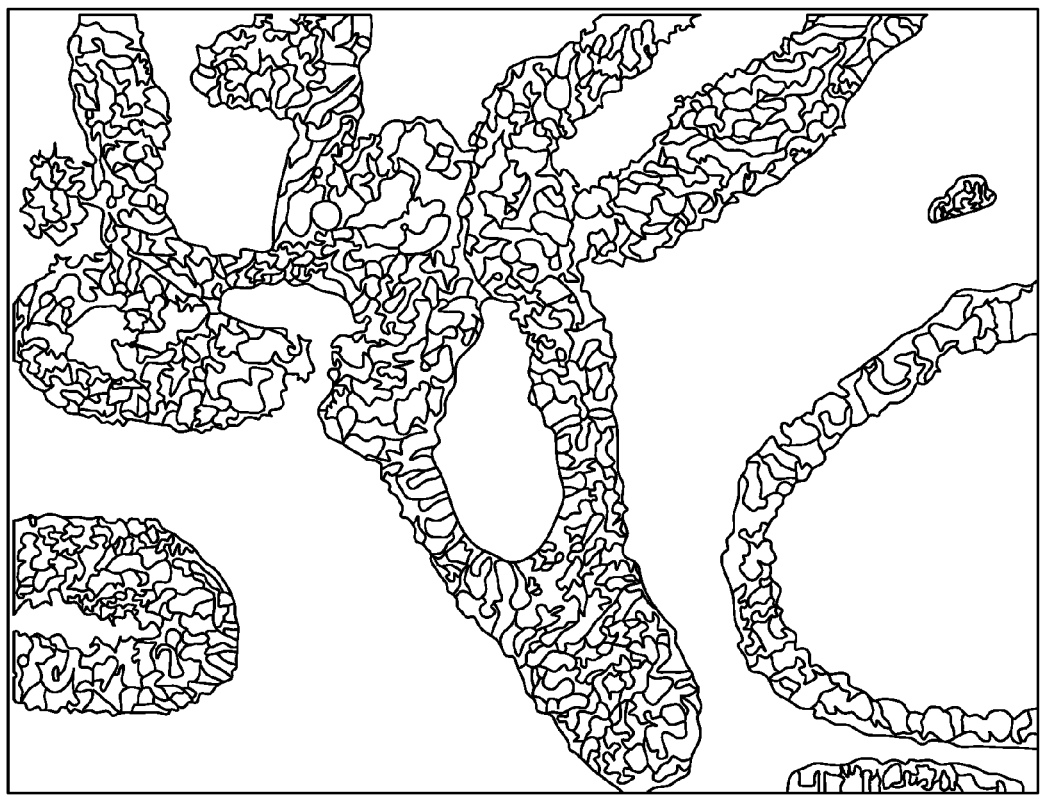

FIGS. 4(a), 4(c) and 4(e) depict several examples of digital images prior to segmentation, and FIGS. 4(b), 4(d) and 4(f) depict several examples of the digital images of FIGS. 4(a), 4(c) and 4(e), respectively, after segmentation using techniques according to one or more embodiments, as taught herein.

In some embodiments, the segmentation may displayed with a color map, where each biological unit is color coded to represent the rank of the biological units. For example, in one embodiment, the cells in the target digital image that are most highly ranked are color coded in a first color, e.g., green; those that are lower ranked are color coded in a second color, e.g., yellow; and those ranked lowest are color coded in a third color, e.g., red. Any number of colors related to any number of cell ranks or rank ranges can be used for displaying the color map.

Figure 5:
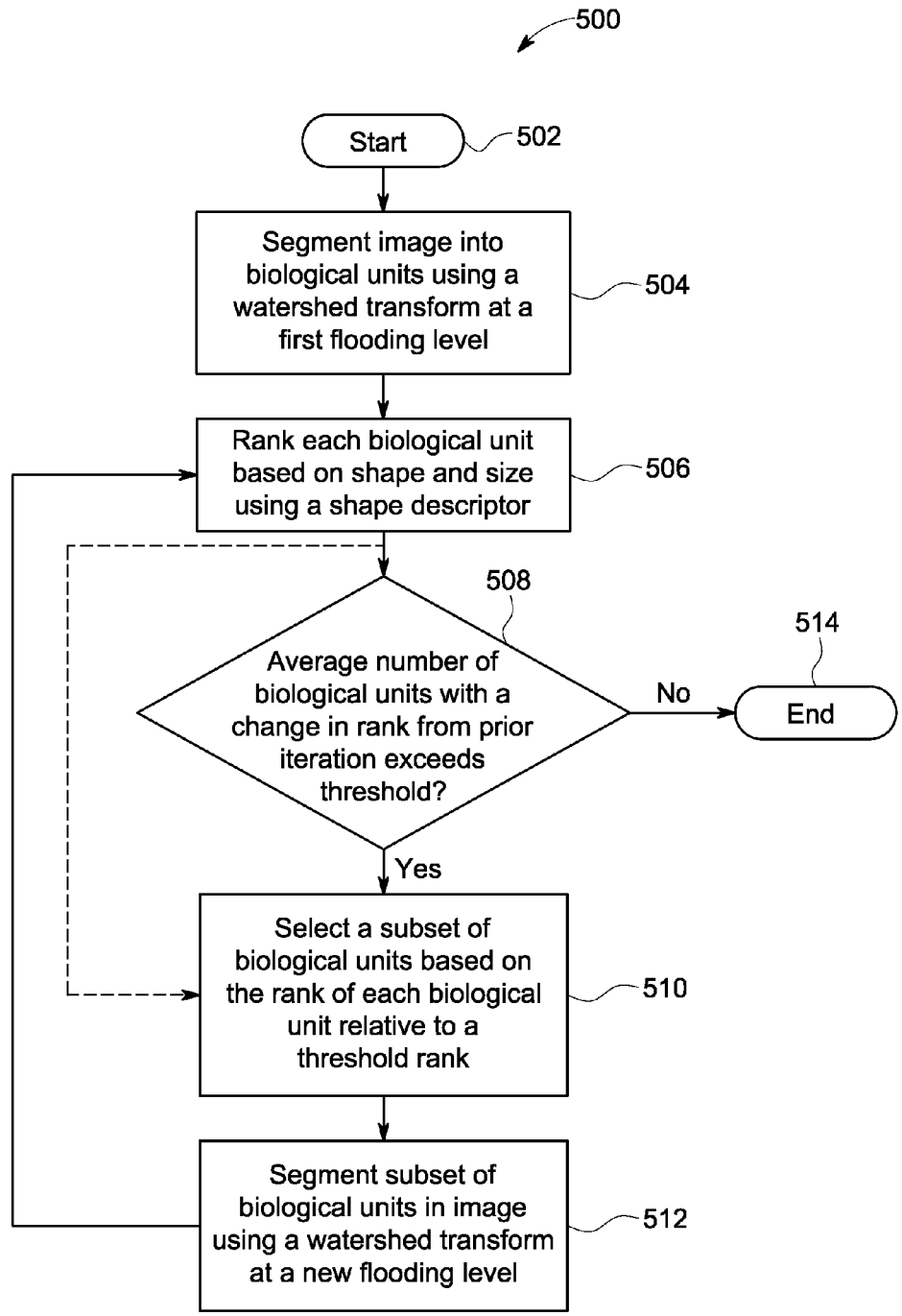
FIG. 5 is a flow chart of one example of a method of segmenting a digital image, in accordance with one embodiment.

FIG. 5 is a flow chart of one example of a process of segmenting a digital image 500, according to one embodiment. Process 500 begins at block 502. At block 504, the digital image is segmented into a first set of objects (e.g., cells or other biological units) using a first watershed transform at a first predetermined flooding level (e.g., level 12). The boundaries of each cell may be identified in the segmented image using, for example, a multiscale analysis based on a shape descriptor (e.g., a two-dimensional variable diameter ring) as in equation 1, described above.

At block 506, each cell in the first set is compared with one or more other cells in the first set on the basis of shape and scale using the shape descriptor described above (e.g., a two-dimensional variable diameter ring). Based on the comparisons, each cell may be ranked according to its degree of similarity with the other cells. The ranking may be used to distinguish normal (i.e., well-segmented) cells from abnormal (i.e., under-segmented) cells based on cell-to-cell shape and scale similarity. For example, a cell may be ranked according to the weighted sum of the similarities between the cell and other cells, as described with respect to equations 3 and 8 above.

On the first iteration, process 500 may proceed to block 510; otherwise, process 500 proceeds to block 508, as discussed below. At block 510, a subset of cells in the digital image is selected based on the rank of each cell relative to a predetermined threshold rank. The subset of cells may include, for example, cells ranked in the top one-third of the first set, which may include some or all of the abnormal cells in the first set. At block 512, the digital image is re-segmented by applying a second watershed transform to portions of the digital image containing the subset of cells using a second pre-determined flooding level that is different than the first flooding level (e.g., level 9, 6, or 3). Process 500 then proceeds to block 506, where each cell in the re-segmented digital image is again compared and ranked, as described above.

If the rank of any cell changes from one iteration of segmentation to another, then it can be assumed that the segmentation of the digital image has improved with each iteration; that is, there may be fewer under-segmented cells remaining in the digital image after subsequent iterations. However, if the approximate rank or position in the rank of a majority of cells does not change substantially from one iteration to another, then it is assumed that no further improvement in segmentation can be achieved because either there are few or no remaining under-segmented cells or the remaining under-segmented cells cannot be further segmented. Therefore, at block 508, if an average number of cells in the digital image that change rank from a prior iteration of segmentation exceeds a predefined threshold, then process 500 proceeds to block 510 for further re-segmentation of the digital image at a second predetermined watershed flooding level, which may be different than the first predetermined watershed flooding level. Likewise, if the average number of cells that change rank from a prior iteration of segmentation does not exceed the predefined threshold, process 500 ends at block 514. In another embodiment, the process may proceed to block 510 for each of a finite number of iterations through process 500, after which process 500 ends at block 514.

Figure 6:
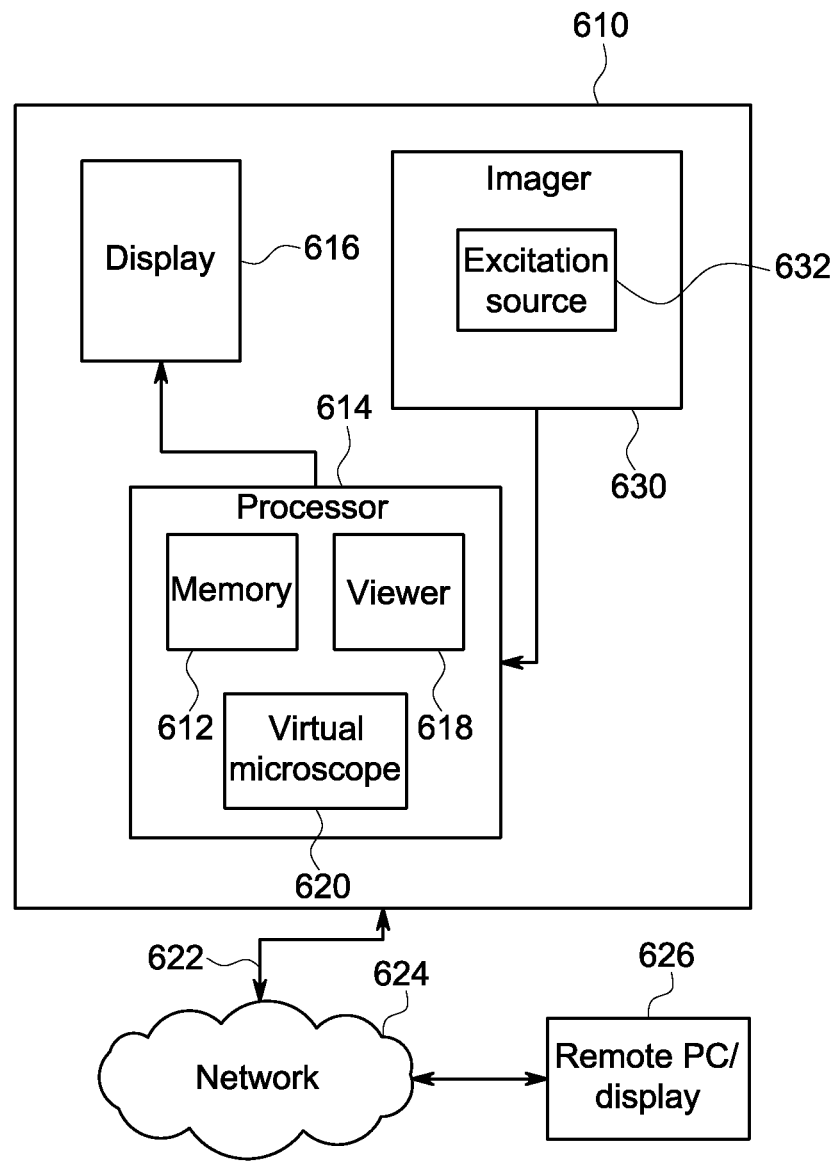
FIG. 6 is a block diagram of one example of a system for carrying out one or more embodiments.

FIG. 6 is a block diagram of one example of a system 610 for carrying out one or more embodiments. The system 610 includes a memory 612 for at least temporarily storing digital images and/or computer-executable instructions for performing one or more of the methods or processes taught herein, a processor 614 for executing instructions for performing one or more acts of the methods and processes taught herein, and a display 616. The memory 612 may include any suitable memory associated with the processor, such as ROM (read only memory), RAM (random access memory) or DRAM (dynamic random access memory), or any suitable non-transitory memory medium, such as a DVD, CD or memory card. The memory 612 may be remotely located from the processor 614 or the display 616, and yet still be accessed through any suitable connection device or communications network including but not limited to local area networks, cable networks, satellite networks, and the Internet, regardless whether hard wired or wireless. The processor 614, or CPU, may comprise a microprocessor, microcontroller and a digital signal processor (DSP).

The memory 612 and the processor 614 may be incorporated as components of an analytical device such as an automated high-speed system that images and analyzes in one system. Examples of such systems include, but are not limited to, General Electric's InCell analyzing systems (General Electric Healthcare Bio-Sciences Group, Piscataway, N.J.). As noted, system 610 may further include a display 616 for displaying one or more of the images, an interactive viewer 618, a virtual microscope 620, and/or a network interface 622 for transmitting one or more of the images or any related data or analytical information over a communications network 624 to one or more remote computers or displays 626.

The display 616 may include any device capable of displaying a digital image, such as devices that incorporate an LCD or CRT. The network interface 622 may include any components configured to transmit and/or receive data over a communications network, including hardwired or wireless digital communications systems. The system 610 may further include a digital imaging device 630, such as a fluorescent imaging microscope having an excitation source 632 and configured to capture digital images of the biological samples.

In some embodiments, the memory 612 may include executable code for performing segmentation of cells or other biological units. One of ordinary skill in the art will understand that many known automated segmentation methods and techniques may be employed for segmentation, which may include watershed feature detection, statistically driven thresholding, (e.g., Otsu, mean, MinError, Huang, triangles, and MinMax thresholding) and/or edge enhancing filters (e.g., unsharp masking, Sobel filtering, Gaussian filters, Kalman filters). In some embodiments, the executable code may include functionality for user-assisted segmentation of cells or other objects (e.g., tools allowing users to indicate cell or object boundaries).

Embodiments taught herein may be used in a variety of applications, such as cell differentiation, cell growth, cell movement and tracking, and cell cycle analysis. Cell differentiation includes identification of subpopulations of cells within cell clusters. Such information may be useful in many different types of cellular assays, such as co-culture assays in which two or more different kinds of cells are grown together.

Having thus described several exemplary embodiments of the invention, it is to be appreciated various alterations, modifications, and improvements will readily occur to those skilled in the art. For example, in some embodiments, digital images of biological units other than cells may be segmented. The biological units may include biological structures larger than cells, such as the lens of an eye, a heart valve, or an entire organ. Such alterations, modifications, and improvements are intended to be part of this disclosure, and are intended to be within the scope of the invention. Accordingly, the foregoing description and drawings are by way of example only.

What is claimed is:

1. An unsupervised computer-implemented method of segmenting a digital image of biological tissue, the computer including a processor, the method comprising acts of:
  generating, by the processor, a first weak unsupervised data driven segmentation of the digital image of the biological tissue to segment the digital image into a first set of biological units where the biological units are the boundary of each cell of the biological tissue;
  assigning, by the processor, an unsupervised individual rank to each biological unit in the first set of biological units based on a similarity in shape and scale between the biological unit and one or more other biological units in the first set of biological units, wherein a geometric model is used to define the similarity as a function of a weighted sum of the similarity in shape and scale between each biological unit and the one or more other biological units; and selecting, by the processor, a subset of biological units from the first set of biological units, where the subset of biological units are boundaries of cells in the biological tissue, based on the unsupervised individual rank of each biological unit relative to a predetermined threshold rank;

generating, by the processor, a second weak unsupervised data driven segmentation of only a portion of the digital image including the subset of biological units to segment the portion of the digital image into a fully unsupervised second set of biological units; and repeating the acts of assigning the rank, selecting the subset and generating the second weak unsupervised data driven segmentation until an average change in the rank of substantially all of the biological units in the digital image is no greater than a predetermined threshold level subsequent to the act of generating the second weak unsupervised data driven segmentation, wherein the second weak or data driven segmentation is different each time the second weak or data driven segmentation is generated.

2. The computer-implemented method of claim 1, further comprising an act of computing, by the processor, the shape of each biological unit by applying a shape descriptor corresponding to a model of a two-dimensional ring having a variable diameter to the respective biological unit.

3. The computer-implemented method of claim 1, wherein the shape and scale of each biological unit is represented as a histogram of points corresponding to a boundary of the biological unit, each point being located on a polar coordinate plane.

4. The computer-implemented method of claim 3, further comprising an act of computing, by the processor, the similarity in shape between the biological unit and one of the other biological units in the first set of biological units as an exponential function of a distance between the respective histograms of the biological unit and the other biological unit.

5. The computer-implemented method of claim 4, further comprising an act of rotating each biological unit within the polar coordinate plane such that an axis of least inertia of the biological unit coincides with a zero degree radial of the polar coordinate plane prior to computing the similarity in shape between the biological unit and the other biological unit, the axis of least inertia including a line from which the integral of the square of distances to each point on the boundary of the biological unit is a minimum.

6. The computer-implemented method of claim 3, further comprising an act of computing, by the processor, the similarity in scale between the biological unit and one of the other biological units in the first set of biological units as an exponential function of a difference between an area of the biological unit in the polar coordinate plane and an area of the other biological unit in the polar coordinate plane.

7. The computer-implemented method of claim 1, wherein each biological unit selected for the subset of biological units has a rank above the predetermined threshold rank.

8. The computer-implemented method of claim 7, wherein higher rankings correspond to lesser similarities in shape and scale between the biological unit and the one or more other biological units.

9. The computer-implemented method of claim 1, wherein the first set of biological units includes a cell.

10. The computer-implemented method of claim 1, wherein:
generating the first weak or data driven segmentation includes applying, by the processor, a first watershed transform at a first predetermined flooding level to the image data representing the digital image of the biological tissue to segment the digital image into the first set of biological units; and
generating the second weak or data driven segmentation includes applying, by the processor, a second watershed transform at a second predetermined flooding level to the image data representing the portion of the digital image including the subset of biological units to segment the portion of the digital image into the second set of biological units.

11. The computer-implemented method of claim 10, wherein the second predetermined flooding level is different each time the second watershed transform is applied.

12. The computer-implemented method of claim 1, further comprising generating, by the processor, a color map representing the first set of biological units in which each biological unit is assigned one of a plurality of different colors corresponding to the respective rank of the biological unit.

13. A non-transitory computer-readable medium having stored thereon computer-executable instructions that when executed by a computer cause the computer to:
generate a first weak or data driven segmentation of a digital image of biological tissue to segment the digital image into a first set of biological units where the biological units are the boundary of each cell of the biological tissue;
assign an unsupervised individual rank to each biological unit in the first set of biological units based on a similarity in shape and scale between each biological unit and one or more other biological units in the first set of biological units;
select a subset of biological units from the first set of biological units, where the subset of biological units are boundaries of cells in the biological tissue, based on the rank of each biological unit relative to a predetermined threshold rank, wherein the predetermined threshold is selected to separate a well-segmented portion of the digital image from an under-segmented portion of the digital image; and
generate a second weak unsupervised data driven segmentation of the under-segmented portion of the digital image including the subset of biological units to segment the under-segmented portion of the digital image into a fully unsupervised second set of biological units; and
repeating the acts of assigning the rank, selecting the subset and generating the second weak unsupervised data driven segmentation until an average change in the rank of substantially all of the biological units in the digital image is no greater than a predetermined threshold level subsequent to the act of generating the second weak unsupervised data driven segmentation, wherein the second weak or data driven segmentation is different each time the second weak or data driven segmentation is generated.

14. A system for segmenting a digital image of biological tissue comprising:
- a processor;
- an input coupled to the processor and configured to receive image data representing the digital image of biological tissue; and
- a memory coupled to the processor, the memory including computer-executable instructions that when executed by the processor cause the processor to:
  - generate a first weak or data driven segmentation of the image data to segment the digital image into a first set of biological units where the biological units are the boundary of each cell of the biological tissue;
  - assign an unsupervised individual rank to each biological unit in the first set of biological units based on a similarity in shape and scale between the biological unit and one or more other biological units in the first set of biological units, where a geometric model is used to define the similarity as a function of a weighted sum of the similarity in shape and scale between the biological unit and the one or more other biological units;
  - select an under-segmented subset of biological units from the first set of biological units, wherein the under-segmented subset does not include a well-segmented set of biological units, where the subset of biological units are boundaries of cells in the biological tissue, based on the unsupervised rank of each biological unit relative to a predetermined threshold rank and wherein the well-segmented subset and the under-segmented subset are separated by the threshold rank such that the under-segmented subset comprises biological units having a lower degree of similarity in shape and scale relative to the well-segmented subset;
  - generate a second weak unsupervised data driven segmentation of the image data representing a portion of the digital image including the under-segmented subset of biological units to segment the portion of the digital image into a fully unsupervised second set of biological units; and
  - repeat assigning the rank, selecting the subset and generating the second weak unsupervised data driven segmentation until an average change in the rank of substantially all of the biological units in the digital image is no greater than a predetermined threshold level subsequent to the act of generating the second weak unsupervised data driven segmentation, wherein the second weak or data driven segmentation is different each time the second weak or data driven segmentation is generated.

15. The system of claim 14, wherein the memory further includes computer-executable instructions that when executed by the processor cause the processor to compute the shape of each biological unit by applying a shape descriptor corresponding to a geometric model of a two-dimensional ring having a variable diameter to the respective biological unit.

16. The system of claim 15, wherein the shape and scale of each biological unit is represented as a histogram of points corresponding to a boundary of the biological unit, each point being located on a polar coordinate plane.

17. The system of claim 16, wherein the memory further includes computer-executable instructions that when executed by the processor cause the processor to compute the similarity in shape between the biological unit and one of the other biological units in the first set of biological units as an exponential function of a distance between the respective histograms of the biological unit and the other biological unit.

18. The system of claim 16, wherein the memory further includes computer-executable instructions that when executed by the processor cause the processor to compute the similarity in scale between the biological unit and one of the other biological units in the first set of biological units as an exponential function of a difference between an area of the biological unit in the polar coordinate plane and an area of the other biological unit in the polar coordinate plane.

19. The system of claim 14, wherein the memory further includes computer-executable instructions that when executed by the processor cause the processor to:
- apply a first watershed transform at a first predetermined flooding level to the image data representing the digital image of the biological tissue to segment the digital image into the first set of biological units; and
- apply a second watershed transform at a second predetermined flooding level to the image data representing the portion of the digital image including the subset of biological units to segment the portion of the digital image into the second set of biological units.

20. The system of claim 19, wherein the second predetermined flooding level is different each time the second watershed transform is applied.

21. The system of claim 14, wherein the memory further includes computer-executable instructions that when executed by the processor cause the processor to generate a color map representing the first set of biological units in which each biological unit is assigned one of a plurality of different colors corresponding to the respective rank of the biological unit.

22. The non-transitory computer-readable medium of claim 13, wherein the under-segmented portion of the digital image is associated with portions of the digital image with lower similarity of size and scale between biological units relative to the well-segmented portion of the digital image.

23. The non-transitory computer-readable medium of claim 13, wherein the under-segmented portion of the digital image is a greater portion of the digital image than the well-segmented portion.

24. The computer-implemented method of claim 1, wherein the scale similarity of each biological unit is determined based on a scale difference between two individual biological units and a mean value of all scale differences between the biological units of the digital image.

* * * * *